United States Patent [19]

Sakata et al.

[11] Patent Number: 5,972,812
[45] Date of Patent: Oct. 26, 1999

[54] IONIC SUBSTANCE REMOVING MATERIAL FOR USE IN SUPER-CLEAN ROOM AND METHOD OF MANUFACTURING THE MATERIAL

[75] Inventors: Kunihiro Sakata; Hiroshi Nonaka; Toshinori Suenaga; Shingo Tokunaga; Susumu Shuutoku, all of Kumamoto; Goro Fujiwara, Osaka; Mitsunobu Masuda, Osaka; Shinji Hattori, Osaka; Naoki Irie, Osaka, all of Japan

[73] Assignee: Noritsu Koki Co. Ltd, Wakayama-Khi, Japan

[21] Appl. No.: 09/061,968

[22] Filed: Apr. 17, 1998

Related U.S. Application Data

[62] Division of application No. 08/757,322, Nov. 27, 1996, Pat. No. 5,856,250.

[30] Foreign Application Priority Data

Nov. 29, 1995 [JP] Japan ..................................... 7-310283
Dec. 12, 1995 [JP] Japan ..................................... 7-322825

[51] Int. Cl.$^6$ ..................................................... B32B 5/26
[52] U.S. Cl. ................. 442/243; 442/197; 2/901
[58] Field of Search ..................................... 442/197, 243; 2/901

[56] References Cited

U.S. PATENT DOCUMENTS 3,869,376  3/1975  Tejeda .
3,940,916  3/1976  Grot .

*Primary Examiner*—Christopher Raimund
*Attorney, Agent, or Firm*—Fulbright & Jaworski, LLP

[57] ABSTRACT

An ionic substance removing material for use in a super-clean room and a method of manufacturing the material are disclosed. The material includes an ion exchanger capable of an ion exchange reaction.

2 Claims, 1 Drawing Sheet

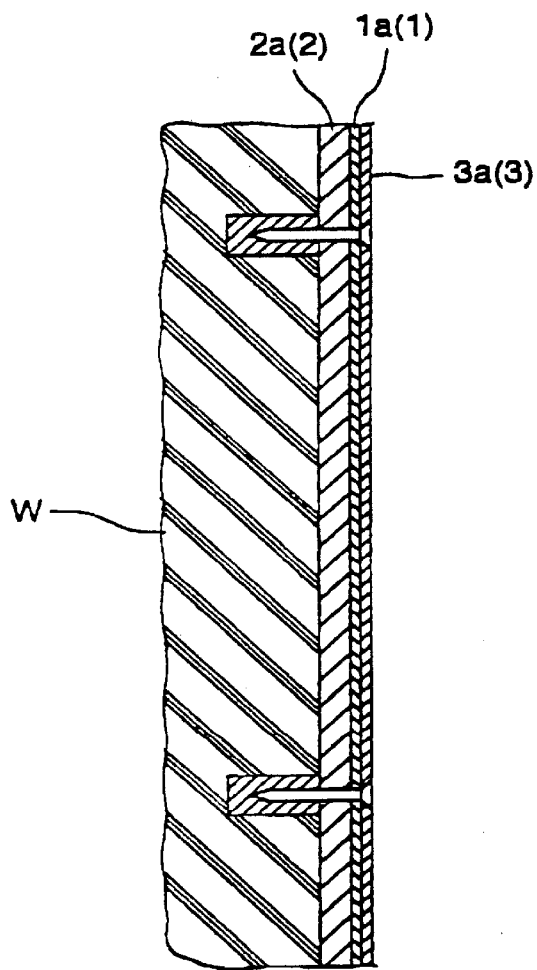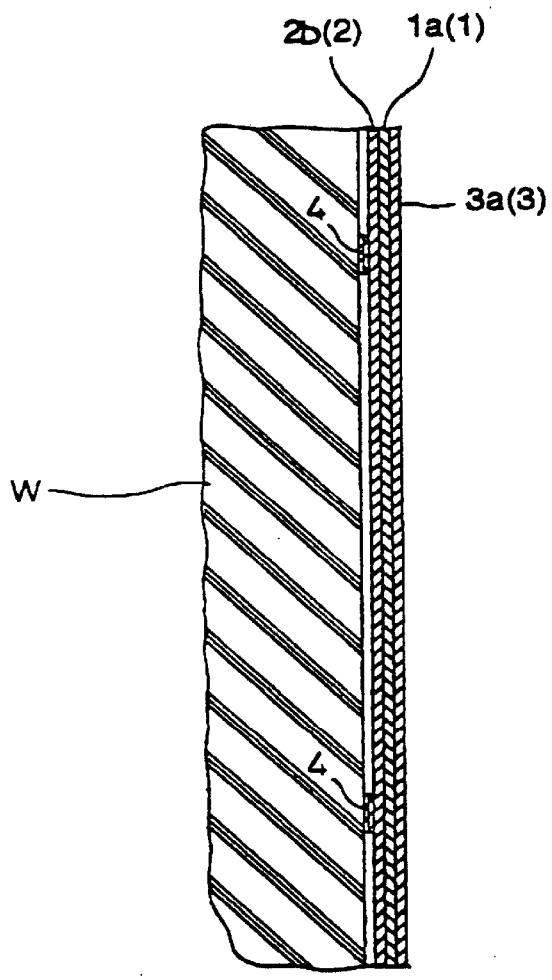

IONIC SUBSTANCE REMOVING MATERIAL FOR USE IN SUPER-CLEAN ROOM AND METHOD OF MANUFACTURING THE MATERIAL

This application is a divisional of 08/757,322, filed Nov. 27, 1996 now U.S. Pat. No. 5,856,250.

BACKGROUND OF THE INVENTION

1. Field of the Invention

The present invention relates to ionic substance removing material for use in a clean room such as a superclean room. The invention relates, more particularly, to a covering material or member for covering a concrete wall of the clean room or a garment to be used in such super-clean room. The invention relates also to a method of manufacturing the material.

2. Description of the Related Art

As the concrete wall covering material or member for covering a concrete wall constituting e.g. an interior wall of a construction work, there have long been known such interior materials or members as a panel, board, sheet, paper material and so on. Also known is a concrete wall covering member with improved anti-dust generating property for use in particular in covering a concrete wall of a clean room.

In recent years, there has been demand from the semiconductor industries for higher integration of print wiring for example. It has been found out, however, that with prevention of dust generation in a clean room, improvement achievable in the degree of integration falls short of the industries' demand. For this reason, the industries have been considering the possibility of meeting the demand for higher integration by removing not only solid particles through prevention of dust generation inside the room, but also volatile, organic and inorganic chemical contaminants. Specifically, it has been proposed to remove the chemical contaminants by incorporating a chemical filter within a ventilation system of the clean room.

However, with the conventional method of removing chemical contaminants which relies solely on the incorporation of a chemical filter within the ventilation system of the clean room, ionic gases present in the clean room cannot be eliminated satisfactorily. Hence, the conventional method has been unable to achieve complete freedom from bacteria, dust and chemical contaminants.

Then, the present inventors have conducted extensive analysis on the above-described situation. The analysis has led the inventors to the following realization. Namely, a concrete wall used for constructing a clean room discharges therefrom various kinds of inorganic ionic substances into the clean room and these ionic substances cannot be removed by the chemical filter. Then, if the source of the ion gas generation is completely shielded, it will become possible to achieve improvement toward complete freedom from bacteria, dust and chemical contaminants. However, in the case of the conventional concrete wall covering material, attention has been paid solely on its dust generation preventing performance. For this reason, it has been impossible to remove the ionic gases present in the clean room.

In views of the above-described state of the art, a primary object of the present invention is to provide, in e.g. a clean room, greater freedom from bacteria, dust and chemical contaminants by preventing volatilizing discharge of ionic gases from the concrete wall surface.

A further object of the present invention is to provide a method capable of easily and reliably removing volatilized or floating ionic substances within a working atmosphere.

SUMMARY OF THE INVENTION

For accomplishing the above-noted object, ionic substance removing material for use in a super-clean room, according to the invention, comprises an ion exchanger capable of ion exchange reaction.

The material having the above-described construction can entrap and remove ionic gases which could not be removed by the conventional method. Then, by using this material, it has become possible to achieve greater freedom from bacteria, dust and chemical contaminants in a clean room, for example.

According to one aspect of the present invention, the ionic substance removing material comprises a concrete wall covering member, and the covering member including an ion exchanger laster having an ion exchanger capable of ion exchange reaction, and the ion exchanger layer includes a non-ion-exchanger permeable layer on one side thereof and an anti-dust-generation layer on the other side thereof.

The non-ion-exchanger permeable layer may be an air communicating gap.

When a clean room is constructed as a concrete construction work made of concrete material, it is believed that the concrete material requires about 10 years for completion of its hydraulic reaction. Within the concrete material which has not yet completed its hydraulic reaction, there exist significant amounts of various components such as calcium salts or sodium salts in the form of ions, and these ions are volatilized and scattered about in the clean room. Incidentally, at present, major ion is detected are ammonium ion and sodium ion.

Then, if the above-described concrete wall covering member is attached on the concrete wall of e.g. a clean root with the non-ion-exchanger permeable layer being oriented to face the concrete wall, then, ions, which volatilized from the concrete wall surface, can pass through the non-ion-exchanger permeable layer to reach the ion exchanger layer. With this, the ions contacting the ion exchanger layer are entrapped by the layer. Accordingly, volatilized scattering of the ions inside the clean room may be effectively restricted.

Further, as the non-ion-exchanger permeable layer is provided on the one side of the ion exchanger layer, the ion exchanger layer may be disposed in such a manner as to cover the concrete wall surface via the non-ion-exchanger permeable layer. That is to say, the ion exchanger layer may be indirectly attached to the concrete wall surface without contacting this wall surface. This arrangement prevents the ion exchanger contained in the ion exchanger layer from directly entrapping the ions which should be gradually volatilized from the concrete wall surface or should be entrapped by the hydraulic reaction of the concrete before being volatilized therefrom. Hence, this arrangement can prevent the inconvenience of the ion exchanger effecting the ion exchange reaction too rapidly and its activity deteriorating within a short period of time. Consequently, it becomes possible for the ion exchanger to maintain its activity, for a prolonged period of time, i.e. the period of about 10 years required by the concrete wall to complete its hydraulic reaction, so that the material may continuously provide the ion removing performance for an extended period of time.

Further, since the anti-dust-generation layer is provided on the other side of the ion exchanger layer facing the inside of the clean room, it is possible to prevent this ion exchanger layer per se from becoming a dust generating source.

Preferably, the ion exchanger layer comprises ion exchanger nonwoven fabric.

The ion exchanger layer may be formed of any one of woven fabric, nonwoven fabrid, paper fabric and so on provided with strong acid cationic fiber treatment, weak acid cationic fiber treatment, strong acid anionic fiber treatment or weak acid anionic fiber treatment. Preferably, the woven fabric or nonwoven fabric comprises the ion exchanger fiber. With these, the treatment of the material may be readily effected and at the same time the material may be provided with a large ion exchange capacity.

The non-ion-exchanger permeable layer may be a plaster board.

Further alternatively, the non-ion-exchanger permeable layer may be woven fabric or paper.

In summary, the non-ion-exchanger permeable layer may be formed of a plaster board, porous resin sheet, paper sheet, woven fabric or the like. The use of plaster board is particularly preferred in that it provides the ion exchanger layer with shape-retaining property which advantageously facilitates handling of the material.

Preferably, the anti-dust-generation layer is a resin film or a stainless sheet.

Further, the anti-dust-generation layer may be provided with coating with e.g. porous fluorine plastic. Especially, if the layer is constructed from porous resin material having a thickness of 5 to 30 um, it is possible to prevent decrease in the ion exchange capacity due to adsorption of ions present in the room. Also, if the layer is constructed from resin material which hardly allows permeation of gas therethrough, ion gas generated from the concrete may be retained between the anti-dust-generation layer and the concrete wall thereby to secure sufficient time period for the contact between the ion exchanger and the ion gas. As a result, this construction will provide the further advantage allowing the ion exchange reaction between the ion exchanger and the ion gas to take place more reliably.

More preferably, the anti-dust-generation layer is formed of conductive material.

By this, it becomes possible to prevent the anti-dust-generation layer from adsorbing dust in the room due to electro static charge developed therein by electromagnetic influence from the room environment. That is to say, this construction advantageously prevents the anti-dust-generation layer per se from becoming dust generating source. In this case too, the anti-dust-generation layer may be a stainless sheet or foil. On the other hand, if the anti-dust-generation layer is provided as a resin coating layer, the ion exchanger layer and the anti-dust-generation layer may be readily integrated with each other by heat fusing.

Still alternatively, the ionic substance removing material may be provided in the form of an ionic substance removing garment material formed by weaving fiberous material containing ion exchanger fibers.

The above invention has been achieved by the present inventors, based on the following concept. Namely if the ionic substance removing garment material is formed of the ionic substance removing material by weaving fiberous material containing ion exchanger fibers and a worker wears a garment using this garment material, it will be possible to present volatilization of ions due to e.g. perspiration of the worker.

That is to say, as the ionic substance removing garment material contains the ion exchanger fibers, ionic substance attempting to permeate through the garment material may entrapped by the ion exchanger fibers contained in this garment material. The garment material resists permeation of ionic substance therethrough, thus restricting volatilization and scattering of the substance into the atmosphere. Then, if the above-described ionic substance removing garment material is used in a garment article to be worn by a worker working in a clean room for instance, ionic substance which may be generated in association with the worker's perspiration will not be discharged through the garment into the clean room, but may be effectively entrapped by the ion exchanger fibers contained in the worker's garment. As a result, the clean room may be maintained clean.

Further, the ion exchanging ability of the ion exchanger fiber may be restored by a chemical treatment, so that the ionic substance removing garment may be used repeatedly. Hence, this invention provides inexpensive means for maintaining cleanness in a clear room for instance.

The fiber material may contain at least one kind selected from the group consisting of strong acid cationic fiber, weak acid cationic fiber, strong acid anionic fiber and weak acid anionic fiber.

With the above, if the material contains one kind of fiber alone for instance, this material may be readily restored. Conversely, if the material contains more than two kinds of fiber, this material will be able to entrap various kinds of ionic substance.

The fiber material may contain at least one selected from the group consisting of polyester, Tetron (registered trademark for polyester fiber), nylon, Vinylon (registered trademark for polyvinyl alcohol fiber), rayon and cotton.

If the ionic substance removing garment material were formed of the ion exchanger fiber alone, this garment material would lack strength, unsuitable for time for a long period of time. On the other hand, if the garment material is formed of not only the ion exchanger fiber but also of any of the above-listed materials, this garment material may provide sufficient strength. Especially, if polyester is used in the garment material, the garment material may obtain high strength, low dust generation characteristics and superior chemical resistance. In addition, this garment material may be formed inexpensively.

Preferably, the fiber material contains the ion exchanger fiber at a ratio greater than 10% and smaller than 50%.

If the ion exchanger fiber were contained in the material at a ratio not greater than 10%, the fiber could not fully provide its ion exchanging ability. Conversely, if the content of the ion exchanger fiber exceeded 50%, this would result in deterioration in the strength of the material for the garment, so that this garment would not be suited for repeated use. Then, if the content of the ion exchanger fiber is set within the above-specified range, the garment material can provide sufficient ion exchanging ability and sufficient strength to be used in a garment as well.

Further alternatively, the ionic substance removing garment material may be formed by overlapping a fabric woven from fiber material containing cationic fiber with a further fabric woven from an anionic fiber, with the fabric and the further fabric being detachable from each other.

If a worker wears a garment using the ionic substance removing garment material having the above-described construction, this worker is covered with the fabric containing cationic fiber and the further fabric containing anionic fiber. Thus, both cationic and anionic substances generated from the human body may be removed by absorption before being discharged into the atmosphere. Further, since these fabrics are detachable from each other, the fabrics may be detached from each other after use of the ionic substance removing garment material, so that the fabrics may be restored independently of each other. Therefore, this construction will render the fabric more convenient for long time use.

The present invention also provides a method of manufacturing the ionic substance removing garment material. This method comprises the steps of; weaving fiber material containing ion exchanger fiber into the garment material with the ion exchange group of the ion exchanger fiber being rendered into the form of salt through an ion exchange reaction; and then restoring the ion exchange group in the form of salt back into the original form of ion exchange group under a low-temperature condition under which the ion exchange group hardly deteriorates.

That is to say, if the fiber material containing ion exchanger fiber were woven directly, ionic substance present in the environment or in sizing agent or waxing agent used in the weaving operation would inadvertently be bonded to the ion exchange group, so that its restoration would become difficult. On the other hand, according to the above-described method, the weaving operation is effected after causing the ion exchange group to be bonded in advance with ionic substance which may be readily bonded and desorbed, the above-described difficulty of restoring operation of the ion exchange group may be avoided. Further, if the ion exchanger fiber is exposed to a high temperature, its ion exchange group will be decomposed and deteriorated. Then, according to the above method, the restoration of the ion exchange group in the the form of salt back into the original form of ion exchange group is effected under a condition of a lower temperature (e.g. about 70 to 80° C. in the case of strong acid cationic fiber) than the temperature (e.t. about 90° C. in the case of the strong acid cationic fiber) at which such deterioration of ion exchange group tends to occur. Thus, the garment material manufactured by this method will provide an extremely high ion exchanging ability, so that this garment material may be used continuously for a longer period of time before a restoring operation becomes necessary.

In summary, according to the above-described features of the present invention, ionic substance volatilized from a human body may be readily entrapped without being discharged-into the atmosphere. Hence, the cleanness of the atmosphere may be readily maintained. Also, the frequency of the restoring operation may be advantageously reduced. Whereby the garment material will require smaller amount of labor for e.g. the chemical treatment for the restoration and the running costs may be reduced as well.

Further and other objects, features and effects of the invention will become more apparent from the following more detailed description of the embodiments of the invention with reference to the accompanying drawings.

BRIEF DESCRIPTION OF THE DRAWINGS

FIG. 1 is a section view illustrating an installed condition of a concrete wall covering member according to embodiment <1>, and FIG. 2 is a section view illustrating an installed condition of a concrete wall covering member according to embodiment <2>.

DETAILED DESCRIPTION OF THE PREFERRED EMBODIMENTS (1) FIG. 1 shows an embodiment in which ionic substance removing material relating to the invention is embodied as a concrete wall covering member. Specifically, this concrete wall covering member includes an ion exchanger layer 1 formed of ion exchanger fiber 1a mixed with flame resistant binder fiber. On one side of the ion exchanger layer 1, there is provided, in the form of coating, a not-ion-exchanger permeable layer 2 formed of a plaster board 2a. On the other side of the ion exchanger layer 1, there is formed, also in the form of coating, an anti-dust-generation layer 3 formed of a Teflon (registered trademark for polytetrafluoroethylene resin) film 3a.

The concrete wall covering member having the above-described construction is used for covering a concrete wall W by being fixedly nailed thereto, with its anti-dust-generation layer 3 being oriented to face the inside of a clean room. Incidentally, since the non-ion-exchanger permeable layer 2 is constructed of the relatively stiff plaster board 2a, the handling and nail-fixing of this covering member may be effected easily.

(2) FIG. 2 shows a further concrete wall covering member. This covering member includes an ion exchanger layer 1 formed of nonwoven fabric containing flame resistant ion exchanger fiber 1a. On one side of the ion exchanger layer 1, there is provided, in the form of coating, a non-ion-exchanger permeable layer 2 formed of fused polyester nonwoven fabric 2b. On the other side of the ion exchanger layer 1, there is provided, also in the form of coating, an anti-dust-generation layer 3 formed of a Teflon film 3a. Further, on the side of the non-ion-exchanger permeable layer 2 opposite to the ion exchanger layer 1, there is provided a surface fastener 4. Then, the concrete wall covering member having the above-described construction is used for covering the concrete wall W by being fixedly thereto by means of the surface fastener 4, with its anti-dust-generation layer 3 being oriented to face the inside of a clean room. Incidentally, since this concrete wall covering member is formed mostly of the fibrous materials with resin coatings, this covering member has flexibility, so that the member may be readily attached to the concrete wall W regardless of its shape for covering the same. Also, this member is easy to handle and light-weight as well.

(3) In the anti-dust-generation layer 3 used in the concrete wall covering member of (2), the side of this layer 3 opposite to the ion exchanger layer 1 may be coated with a conductive resin film.

(4) As a material which may function as both the anti-dust-generation layer 3 and the conductive resin film coated on the other side of the ion exchanger layer 1, a stainless sheet or foil may be employed.

In combination with the concrete wall covering members of (1) through (3), a panel frame may be provided so as to facilitate fixing attachment of the covering member to the concrete wall. Further, the covering members may be affixed to the wall face by using appropriate insolvent bonding agent free from volatile component.

In general, because of its structural limitation, a clean room cannot be maintained under a completely sealed state. Further, it is practically almost impossible to eliminate completely contact between the concrete face and the ambience air, because of the is presence of air channel installed under a grating. Also, considering the vast amount of air to be circulated in the clean room, it may be unfeasible to prevent volatilization and intrusion of inorganic ion from the concrete face by means of the above-described concrete wall covering member alone. Yet, in order to cope with the ionic substances present in the clean room, if the concrete wall covering members described above are used respectively for the interior wall of a clean room in combination with a construction in which a chemical filter is incorporated within an air circulation passage for eliminating the ions, the covering members according to the present invention may advantageously reduce the load imposed on such chemical filters, and removal of bacteria, dust and inorganic chemical contaminants may be effected more easily than the conventional construction relied on the filter alone. And, because of the reduced load, the filter may be used for a longer period of time and its maintenance cost may be reduced as well.

Incidentally, the 'ion exchanger' as used herein is not limited to the ion exchanger fiber described above, and rather this term is to be understood to denote any other ion exchangeable medium such as ion exchanger resin, chelate resin and so on. And, this may be provided in the form of a pre-molded inorganic ion exchanger mold product. Also, the ion exchanger layer is not limited to the nonwoven fabric type described above. This may be any other material which has gas permeability leading to effective contact between the ion exchanger fiber and the ambience air.

A trial product of the concrete wall covering member of the foregoing embodiment (2) was fabricated and a test was conducted thereon to check its ion removing effect.

(I) fabrication of the concrete wall covering member:

400 g of strong acid cationic fiber having a fiber length of 40 mm and a total ion exchange capacity of 2.0 meq/g and 600 g of binder fiber having a fiber length or 40 mm were mixed together by the dry method to produce nonwoven fabric having a weight per unit area of 300 g/m$^2$, of which the ion exchanger layer 1 was manufactured. Then, this ion exchanger layer 1 and a Teflon film 3$a$ (PTFE) having a thickness of 10 to 20 $\mu$m were laid one on the other. And, this assembly was press-molded, from the side of the Teflon film 3$a$, by heating rolls at 140° C., so as to press-fit the film 3$a$ to the ion exchanger layer 1, thus forming the anti-dust-generation layer 3. On the other hand, a further nonwoven fabric having a weight per unit area of 100 g/m$^2$ was prepared from 1,000 g of short fiber, i.e. low-melting point polyester resin, having a fiber length of 40 mm. Then, this further nonwoven fabric was heat-fused to the other side of the ion exchanger layer 1 opposite to the Teflon film 3$a$, whereby the concrete wall covering member was obtained.

(II) test

The following test was conducted to verify the effect of the member according to the embodiment.

Three samples of each of following (a) and (b) were prepared.

(a) a sample in which a concrete block was sealed within a container having a capacity of 50 liters.

(b) a sample in which a concrete block and a test piece of the above-described concrete wall covering member were sealed together in a container having a capacity of 50 liters.

Then, after these sealed samples were left for six months, one year and two years respectively, at each of these timings, gas was sampled from within each container and analyzed. The analysis provided results shown in Table 1.

Incidentally, for the above analysis, the sampled gas was caused to be absorbed in super pure water and then the analysis was made by the ion chromatography.

In the table, as for the type (a), reference mark 1A denotes the sample left for six months, mark 1B denotes the sample left for one year, and mark 1C denotes the sample left for two years, respectively. Similarly, as for the other type (b), reference mark 2A denotes the sample left for six months, mark 2B denotes the sample left for one year, and mark 2C denotes the sample left for two years, respectively. A further reference mark D in the table denotes another case in which the gas content inside a sealed container was displaced by nitrogen gas and left for two weeks and then gas was sampled from inside this container. A mark '-' denotes no detection of ions.

Further, the concrete block described above had dimensions: 10 cm width×17 cm thickness×30 cm length and had a total surface area of 0.2 m$^3$. Also, each test piece of the concrete wall covering member was the covering member manufactured as described in (I) and had a total surface area of 0.04 m$^2$.

As may be seen from Table 1, in the case of the samples in which the concrete blocks were sealed together with the concrete wall covering members within the containers, the detected amounts of various kinds of gas are smaller. Especially, it may be seen that the member provides high removing abilities for ammonium ion ($NH_4^+$), chlorine ion ($Cl_-$), nitric acid ion ($NO_3^-$), nitrous acid ion ($NO_2^-$), and sulfuric acid ion ($SO_4^{2-}$).

(III) other concrete wall covering members:

As the ion exchanger layers followings (a) through (c) were used and the ion removing ability of each of these was investigated. The investigation revealed that these too provide high ion removing ability.

(a) a nonwoven fabric made in the same manner as (I) by mixing 700 g of the strong acid cationic fiber and 300 g of the binder fiber.

(b) a nonwoven fabric made by mixing 600 g of the binder fiber and 400 g of ion exchanger fiber mixture containing the above strong acid cationic fiber and strong basic anionic fiber having a total ion exchange capacity of 3.0 meq/g at a mixture ratio of 6:4 and then prepared in the same manner as described in (I).

(c) a nonwoven fabric made by mixing 700 g of the above-described ion exchanger fiber mixture with 300 g of the above-described binder and prepared in the same manner as described in (I).

Preferably, the total ion exchange capacity of the ion exchanger layer is set so as to be able to adsorb all of inorganic ions which will be continuously discharged for about 10 years from the concrete wall face. With such setting, it is possible to avoid such inconvenience of the concrete wall covering member becoming saturated to be unable to prevent volatilized scattering of the ions unless replaced by a new one. Thus, the setting can advantageously eliminate the necessity of the maintenance operation. Specifically, in order to effectively prevent volatilized scattering of ammonium ions ($NH_4^+$) and sodium ions ($Na^+$) from the concrete surface, the ion exchange capacity of the ion exchanger layer should be set preferably at about 50 to 300 g/m$^2$ as converted into an amount of cationic fiber having a total exchange capacity of 2 meq/g.

(IV) effect of the coating layer:

As the Teflon film 3$a$ has the gas permeability, it is conceivable that the ion exchanger layer may inadvertently adsorb ions already present in the air inside the clean room also. However, an experiment conducted in this respect has shown that the ion exchanger layer selectively adsorbs those ions generated from the concrete wall rather than the ions present in the air inside the room. Hence, it has been found out that the ion exchanger layer is less affected adversely by the ions present inside the room resulting in e.g. reduction in its ion exchange capacity and this layer can reliably restrict volatilized scattering of ions generated from the concrete wall surface.

(4) Next, there will be described a further embodiment of the invention in which the ionic substance removing material described above is used for forming an ionic substance removing garment material. A method of manufacturing this garment material will also be described.

<1> Cationic Substance Removing Garment Material

As a warp yarn, a polyester yarn of 400 to 500 denier was used. For preparing a weft yarn, 30 (thirty) filaments of salt type (i.e. having its ion exchange group rendered into the form of salt) strong acid cationic fiber lion exchange equivalent weight 2.0 meq/g) were twined into a twisted yarn of 240 denier and this twisted yarn was further twined with 2 (two) polyester fiber yarns. Then, two to three of these assemblies were twined together, thus providing the weft (twisted) yarn. Thereafter, the above warp yarn and the weft yarn were treated with sizing materials (sizing agent, waxing agent) and then woven together to produce a woven fabric. From this fabric, a garment material was produced. The resultant garment material had an ion exchange group halving a total ion exchange equivalent weight of 120 meq/m$^2$. Then, this garment material was washed with warm water of 60 to 70° C. to remove the sizing agent and then rinsed well with 2% hydrochloric acid to restore the ion exchange group. The garment material was further washed with pure water and then dried, whereby an ionic substance removing garment material was obtained.

The above-described fabric used in the ionic substance removing article was kept in contact with a worker via an ordinary fabric (gauze) having no ion exchanging ability, with the other, i.e. front side of the fabric being covered with a non-gas-permeable film. Then, after this worker did total 24 hours of desk work, the fabric was collected and tested for its adsorption amounts of various ions. The results are shown in Table 2. In the table, the term: 'blank' represents the amount of ions originally present in the fabric before its use.

From this table, it may be seen that the fabric can sufficiently entrap and remove ionic substances such as ammonium ions generated from ammonium component volatilized or discharged from the human body. Further, from the ion exchange equivalent weights described above, it may be realized that the ion exchanger fabric may be used repeatedly for the prevention of volatilized scattering of the ionic substances, provided that the fabric is restored for one time in use of 180 days.

<2> Anionic Substance Removing Garment Material

As a warp yarn, a polyester yarn of 400 to 500 denier was used. For preparing a weft yarn, 30 (thirty) filaments of salt type (i.e. having its ion exchange group rendered into the form of salt) strong acid cationic fiber (ion exchange equivalent weight 2.0 meq/g) were twined into a twisted yarn of 240 denier and this twisted yarn was further twined with 2 (two) polyester fiber yarns. Then, two to three of these assemblies were twined together, thus providing the weft (twisted) yarn. Thereafter, the above warp yarn and the weft yarn were treated with sizing materials (sizing agent, waxing agent) and then woven together to produce a woven fabric. From this fabric, a garment material was produced. The resultant garment material had an ion exchange group having a total ion exchange equivalent weight of 216 meq/m$^2$. Then, this garment material was washed with warm water of 40° C. to remove the sizing agent and then rinsed well with 0,5 to 5 wt % of aqueous solution of sodium hydride to restore the ion exchange group. The garment material was further washed with pure water and then dried, whereby an ionic substance removing garment material was obtained.

In the same manner as described in <1>, the above-described fabric used in the ionic substance removing article was tested for its adsorption amounts of various ions. The results are shown in Table 3.

From this Table 3, it may be seen that this anionic substance removing garment material too can sufficiently entrap and remove ionic substances volatilized or discharged from the human body.

(5) In the foregoing embodiments, the ionic substance removing fiber was used only, in the weft yarns. But, the fiber may be used also in the warp yarns. Further alternatively, only a portion of the twist yarn may be formed of the ion exchanger fiber. In these manners, the ion exchanger fiber may be used in a variety of portions of the garment material.

Further, the ion exchanger fiber may be any one of strong acid cationic fiber, weak acid cationic fiber, strong acid anionic fiber and weak acid anionic fiber.

(6) The garment, material may be used in either an under garment or an outer garment. It is preferred that the cationic substance removing garment and the anionic substance removing garment be worn over another so as to entrap reliably the ionic substances volatilized from the human body.

(7) The ionic substance removing garment may be constructed as a 'reversible' type garment including one of the fabrics of <1> and <2> as its outer fabric and the other as its inner fabric. In this case, the outer fabric and the inner fabric may be restored independently of each other when the performance of either fabric has deteriorated after use of an extended period of time.

The method of the invention does not impose any limitations concerning the weaving step. The weaving step may utilize any conventional methods, without any limitations concerning the type of sizing agent and waxing agent used or use or non-use of theme agents.

(8) The ionic substance removing material of the invention may be contained in any medium or article which allows incorporation of the ion exchanger therein. The material may be alternatively incorporated within floor forming, material, ceiling forming material, sealing material for sealing an a opening, a curtain fabric and so on.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

TABLE 1

| material | F$^-$ | Cl$^-$ | NO$_3^-$ | NO$_2^-$ | SO$_4^{--}$ | Na$^+$ | K$^+$ | NH$_4^+$ |
|---|---|---|---|---|---|---|---|---|
| 1A | <4 | 15 | 4.7 | 5.6 | 4.9 | 36 | 12 | 550 |
| 2A | <4 | — | — | — | — | 5 | 7 | — |
| 1B | <4 | 10 | 4.1 | 5.6 | <4.7 | 33 | 12 | 490 |
| 2B | <4 | — | — | — | — | 5 | 7 | — |
| 1C | <4 | 10 | 4 | 5 | <4 | 30 | 12 | 450 |
| 2C | <4 | — | — | — | — | 5 | 7 | — |
| D | <4 | 11 | 3.1 | <3 | <4 | 28 | <5 | 78 |

(unit: ppb)

TABLE 2

| ion type | adsorbed ion amount A (μg/g) | blank B (μg/g) | actual adsorption amount (A − B) (μg/g) |
|---|---|---|---|
| $NH_4^+$ | 280 | 3.1 | 276.9 |
| $Na^+$ | 780 | 200 | 580 |
| $K^+$ | 290 | 52 | 238 |
| $Ca^{2+}$ | 210 | 100 | 110 |
| $Mg^{2+}$ | 60 | 50 | 10 |
| $Fe^{2+}$ | 17 | 12 | 5 |

TABLE 3

| ion type | adsorbed ion amount A (μg/g) | blank B (μg/g) | actual adsorption amount (A − B) (μg/g) |
|---|---|---|---|
| $Cl^-$ | 1080 | 10 | 1070 |
| $SO_4^{2-}$ | 150 | 25 | 125 |

What is claimed is:

1. A garment material for removing ionic substance floating in a super-clean room, comprising:

ion exchange fiber comprising at least one member selected from the group consisting of strong acidic cationic fibers, weak acidic cationic fibers, strong basic anionic fibers and weak basic anionic fibers; and a non-ionic exchange fiber comprising at least one member selected from the group consisting of polyester, nylon, polyvinyl alcohol, rayon, and cotton;

wherein said garment material is formed by overlapping: a) a fabric woven fiber material comprising a cationic fiber and b) a further fabric woven from a further fiber material comprising an anionic fiber in such a manner that said woven fabric and said further fabric are detachable from each other.

2. The garment material according to claim 1, wherein said cationic and anionic exchange fibers comprise from 10 to 50% of said fabric.

* * * * *

UNITED STATES PATENT AND TRADEMARK OFFICE
CERTIFICATE OF CORRECTION

PATENT : 5,972,812

DATED : Oct. 26, 1999

INVENTOR(S): Sakata et al.

It is certified that error appears in the above-identified patent and that said Letters Patent is hereby corrected as shown below:

In the cover page, in the section entitled Assignee, change "Noritsu Koki Co. Ltd., Wakayama" to
-- Takuma Co., Ltd., Osaka and NEC Corporation, Tokyo --.

Signed and Sealed this

Fifteenth Day of May, 2001

Attest:

Attesting Officer

NICHOLAS P. GODICI

Acting Director of the United States Patent and Trademark Office